United States Patent [19]
Howard

[11] 3,934,543
[45] Jan. 27, 1976

[54] APPARATUS FOR MONITORING THE CONDITION OF A FILTER

[75] Inventor: Durrell U. Howard, San Antonio, Tex.

[73] Assignee: Sherwood Products Corporation, San Antonio, Tex.

[22] Filed: Dec. 23, 1974

[21] Appl. No.: 535,656

[52] U.S. Cl. .......... 116/114 AD; 55/274; 116/67 R; 116/DIG. 25; 340/239 F
[51] Int. Cl.² ......................................... G01D 21/00
[58] Field of Search ....... 116/114 AD, 114 R, 67 R, 116/70, DIG. 25, 112; 15/339; 55/274, DIG. 34; 340/239 F, 243; 200/81.9 R

[56] References Cited
UNITED STATES PATENTS

| 410,502 | 9/1889 | Donner | 340/243 |
|---|---|---|---|
| 2,700,362 | 1/1955 | Calling | 340/239 F |
| 2,746,416 | 5/1956 | Aufderheide | 55/DIG. 34 |
| 2,815,733 | 12/1957 | Rykert | 116/114 AD |
| 2,843,077 | 7/1958 | Leefer | 340/239 F |
| 3,104,542 | 9/1963 | Scoggins | 116/DIG. 25 |
| 3,853,086 | 12/1974 | Asplund | 116/114 AD |

Primary Examiner—Richard C. Queisser
Assistant Examiner—Daniel M. Yasich
Attorney, Agent, or Firm—Pollock, Philpitt & Vande Sande

[57] ABSTRACT

An apparatus for monitoring the condition of a fluid filter comprises a flexible diaphragm exposed to the upstream, downstream or differential pressure acting on the filter and indicator means for monitoring the condition of the filter as a function of movement of the diaphragm in response to said pressures. A unique, low friction indicator mechanism, means for adjusting the sensitivity of the device and means for resetting the device are also disclosed.

13 Claims, 12 Drawing Figures

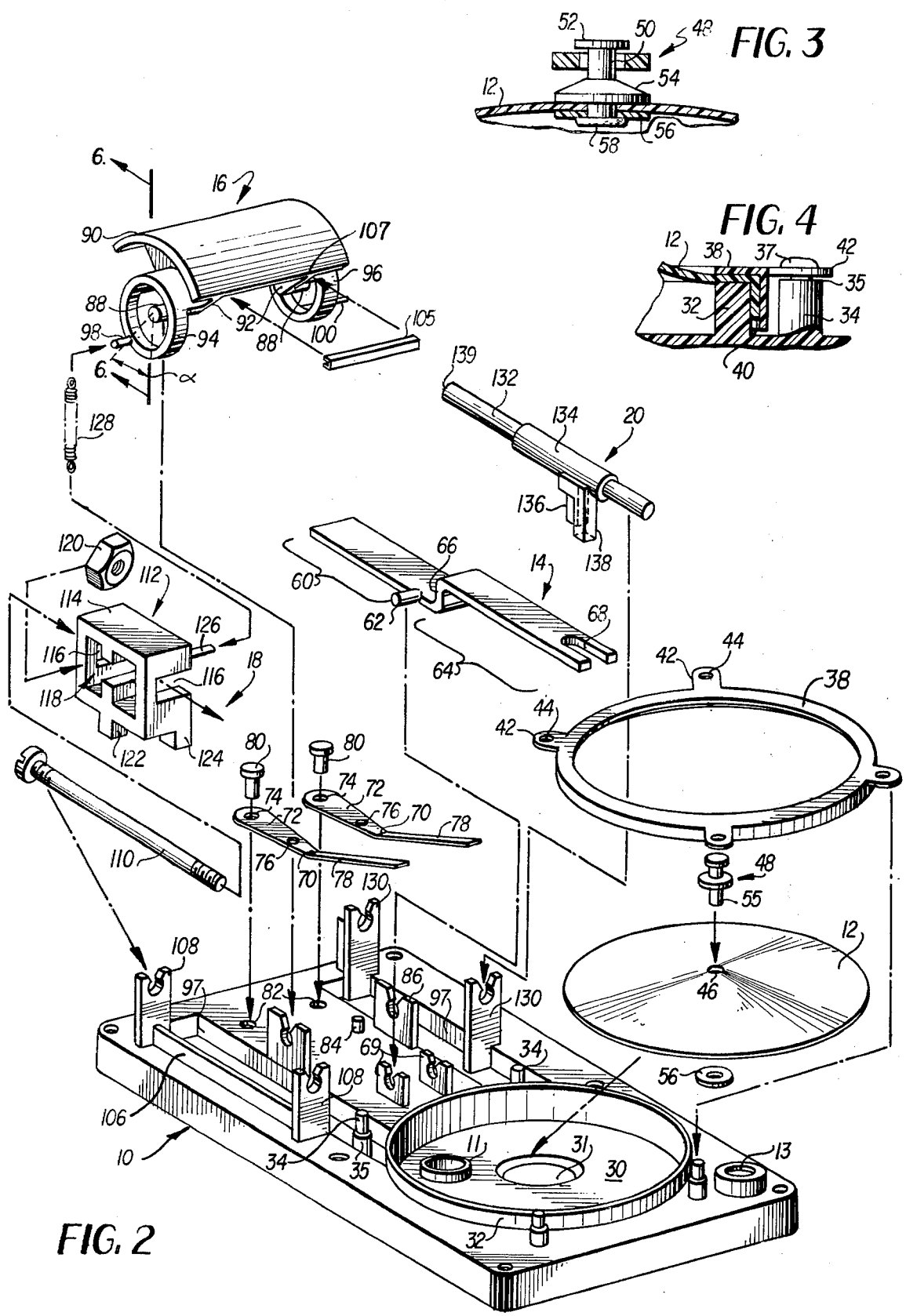

APPARATUS FOR MONITORING THE CONDITION OF A FILTER

BACKGROUND OF THE INVENTION

Attempts have been made in the past to provide means for monitoring the condition of a filter in a fluid system to determine whether the filter has become clogged. The prior art discloses devices for such applications in both liquid and gas flow systems.

In recent years, with the advent of fuel shortages and attendant increases in fuel prices, a growing interest in the efficiency of forced air heating and air conditioning systems has been noted. One problem in such systems is that the filters commonly in use tend to clog with dirt and dust after a rather short time, which results in reduced efficiency of the system due to lower air flow, poor filter performance, wasted fuel and related effects. Thus, it is evident that there is a need for an inexpensive, simple means for monitoring filter conditions and providing an indication of the need to change or clean the filter.

As mentioned, numerous prior art devices are known which are nominally suited for this purpose; however, problems have arisen with many of these. Frequently, the sensitivity of such devices is so low that they provide an indication for the user only when the filter has become hopelessly clogged. Thus, it is desirable that such a device be sensitive to small changes in filter condition and that its sensitivity be adjustable within limits chosen for a particular application. For example, the level of clogging permissible in a hospital may be considerably lower than in a private home. Also, it is desirable to provide a low friction mechanism which will actuate with repeatable reliability in response to low pressure changes in the system in some applications, as well as large pressure changes in other applications.

In addition, most prior art devices require rather involved modifications to an existing forced air system to permit their installation. So, a need exists for a filter monitor which may be simply installed by the user with minimum of modification to his air conditioning system.

OBJECTS OF THE INVENTION

An object of this invention is to provide a simple, inexpensive monitoring device for the filter in a fluid flow system which may be easily installed with a minumum of alteration of the system.

Another object of the invention is to provide such a device which may be easily assembled by relatively unskilled labor.

Yet another object of the invention is to provide a monitoring device having low friction forces among its elements, whereby increased sensitivity may be obtained.

A further object of the invention is to provide a filter monitoring device which may be simply, reliably adjusted for various applications requiring more or less sensitivity to filter clogging.

Still another object of this invention is to provide a filter monitoring system including means for remotely indicating the filter condition.

Another object of this invention is to provide such a device which will indicate an acceptable filter condition until a predetermined state of filter clogging is achieved and thereafter will indicate an unacceptable condition.

A still further object of the invention is to provide means for resetting the device after the filter condition has been corrected.

A further object of the invention is to provide a filter monitoring device sensitive to loss in pressure downstream of the filter, increase in pressure upstream of the filter or change in differential pressure across the filter.

The above objects of the invention are intended to be examplary, and other desirable results not specifically mentioned herein but actually achieved by the invention may occur to those in the art; however, the scope of the invention is to be limited only by the appended claims.

SUMMARY OF THE INVENTION

The above-mentioned object and other desirable results are acheived by the invention which may comprise, when adapted for use in a forced air system having means for drawing air through this system, an enclosed chamber adapted to be connected in fluid communication with the air system at a location between the filter and the means for drawing air through the system. The enclosed chamber is mounted on a base member and includes one wall comprising a flexible diaphragm to which is pivotally attached an elongated arm pivotally mounted to the base member. An indicator flag mechanism is mounted for rotation on the base member in response to the movement of the elongated arm. Means are provided for resisting rotation of the indicator flag from a first position indicative of a clean filter until the pivoted arm has rotated the flag a predetermined distance in response to changes in the pressures acting on the filter; and then for aiding movement of the flag to a second position indicative of a dirty filter after the flag has rotated through the predetermined distance. Means also are provided for adjusting the predetermined distance through which the signal flag must be rotated before its movement to the second position may be affected. Finally, means are provided for returning the signal flag to the first position after the filter condition has been corrected.

In other embodiments of the invention, means are provided for giving a remote indication that the filter has become clogged. Such remote indication may be visual, audible or a combination of the two, as desired. In addition, the rotating or translating elements of the invention are designed so as to minimize friction, whereby the sensitivity of the device to pressure changes is enhanced.

BRIEF DESCRIPTION OF THE DRAWINGS

FIG. 2 shows a perspective, exploded view of the device shown in FIG. 1, with the exception of the cover member shown in phantom in FIG. 1, which has been omitted.

FIG. 3 shows an elevation section taken along line 3—3 of FIG. 1, indicating the cooperation between the diaphragm pivot element and pivot arm slot, according to the invention.

FIG. 4 shows an elevation view taken along line 4—4 of FIG. 1, indicating the cooperation among the upstanding peripheral wall surrounding the diaphragm chamber, the diaphragm, the diaphragm retaining ring and related structure.

DETAILED DESCRIPTION OF THE PREFERRED EMBODIMENT

Figure 1:
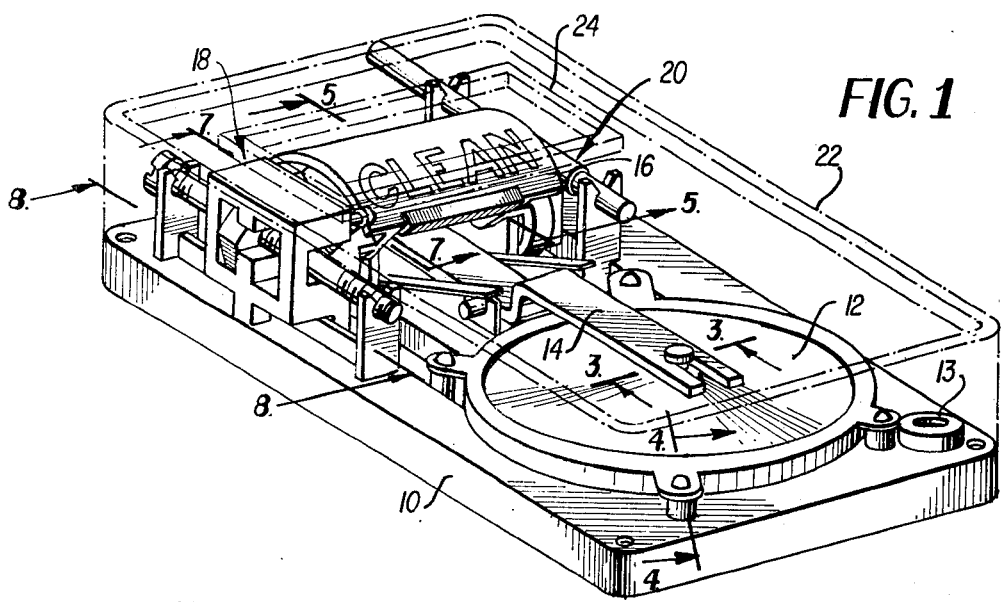
FIG. 1 shows a perspective view, partially in phantom, of a filter monitoring device according to the invention.

There follows a detailed description of a preferred embodiment of the invention, reference being had to the drawings in which like reference numerals identify like elements of structure in each of the several Figures.

FIG. 1 shows a perspective view of a filter monitoring device according to the invention. A base member 10 is provided upon which are mounted a pressure responsive flexible diaphragm 12, an elongated pivot arm 14, and an indicator flag 16, acutated by elongated pivot arm 14 in response to movement of pressure responsive flexible diaphragm 12. Also provided are a sensitivity adjustment mechanism 18 and an indicator flag return mechanism 20. Illustrated in phantom are a box like cover 22 which encloses the previously described apparatus as indicated and includes a window 24 therein through which the position of indicator flag 16 may be observed. Cover 22 should be relatively air tight to minimize pressure losses from above diaphragm 12.

FIG. 2 shows an exploded view of the apparatus depicted in FIG. 1, with the exception of cover member 22 which has been deleted for clarity. Base member 10 includes a circular recess 30 which is surrounded by an upstanding peripheral wall 32. A central recess 31 is provided in the bottom of recess 30. Located at equally spaced stations around the exterior of upstanding peripheral wall 32 are a plurality of mounting stubs 34 having enlarged diameter seating surfaces 35 along their lower portions. Base members 10 also includes low pressure inlet 11 within recess 30 and high pressure inlet 13 outside recess 30, either or both of which may be used to supply actuating pressure to the device, as will be discussed. Connection to inlets 11 and 13 may be made from beneath base member 10 using flexible tubing connectors (not shown).

A retainer ring 38 is provided having, as shown in FIG. 4, an inwardly directed flange 38, an axially directed wall 40 and a plurality of radially directed tabs 42 having bores 44 located therein. Diaphragm 12 includes a centrally located aperture 46 in which is mounted a pivot member 48 as shown in FIG. 3. Pivot element 48 comprises a pivot post 50 having a radially extending terminal flange 52 and a radially extending, tapered base flange 54. Depending downwardly from base flange 54 is a mounting boss 55. Pivot element 48 is assembled to diaphragm 12 by inserting mounting boss 55 through aperture 46 in diaphragm 12, placing mounting washer 56 over mounting boss 55 and deforming mounting boss 55 to provide a retaining flange 58, which ensures a tight joint between washer 56, diaphragm 12 and base flange 54. The deformation of mounting boss 55 may be affected by any suitable means as ultrasonic staking, heat application and similar techniques.

In practice, it has been found preferable to size diaphragm 12 to be from 10 to 30 percent larger in diameter than the diameter of upstanding peripheral wall 32. A 20 percent difference in size is preferred. Diaphragm 12 may be made of any suitable flexible material such as 0.00025 inch Mylar film, a product of the Dupont Company. During assembly, the peripheral edge of diaphragm 12 is placed on the upper surface of upstanding peripheral wall 32 and retaining flange 58 and mounting washer 56 are permitted to drop into central recess 31 so that essentially no tension is placed upon the diaphragm during it attachement to the upstanding peripheral wall 32. After the diaphragm has been so located, retainer ring 36 is placed over the peripheral edge thereof as indicated in FIG. 4, with the bores 44 in radially directed tabs 42 receiving the upper end of mounting studs 34. The retainer ring may be held in place by ultrasonic staking of the upper ends of mounting studs 34 to form a retaining flange 37, as indicated; however, other attachment means such as screws, rivets, heat deformation and the like may be used. It has been found that the joint geometry disclosed in FIG. 4 obviates the need for a glue or heat seal of the joint between diaphragm 12 and upstanding peripheral wall 32 and yet provides a reasonably air-tight peripheral attachement for the diaphragm 12. Nonetheless, one skilled in the art will recognize that such additional measure as gluing or heat sealing may be applied without departing from the spirit of this invention.

Elongated pivot arm 14 comprises an actuating portion 60 for indicator flag 16, a transverse pivot axle 62 and a diaphragm contacting portion 64. An offset portion 66 joins portions 64 and 60 as indicated to provide adequate clearance for pivot arm 14 above upstanding peripheral wall 32. An axial slot 68 located in the end of diaphragm contacting portion 64 loosely engages pivot post 50, as indicated in FIGS. 1 and 3, when transverse pivot axle 62 is snapped into location in upstanding plain bearing supports 69. Supports 69 are of the familiar type which deform slightly to receive axle 62 and spring back to provide a secure, rotating joint.

Located on either side of elongated pivot arm 14 are electrical contacts 70 which comprise an essentially flat base portion 72 having through holes 74 and 76 located at axially spaced locations therein. Extending from base portion 72 is an angularly upstanding spring portion 78 which projects toward chamber 30 and diaphragm 12 along a path essentially parallel to pivot arm 14. Upstanding spring portions 78 are elevated approximately 20° above the plane of base portions 72. Electrical contacts 70 are attached to base element 10 by suitable fasteners such as rivets 80 through holes 74 in contacts 70 and holes 82 in base member 10. Holes 76 in contacts 70 receive bosses 84 located on base member 10, to ensure lateral stability of the contacts 70.

Figure 5:
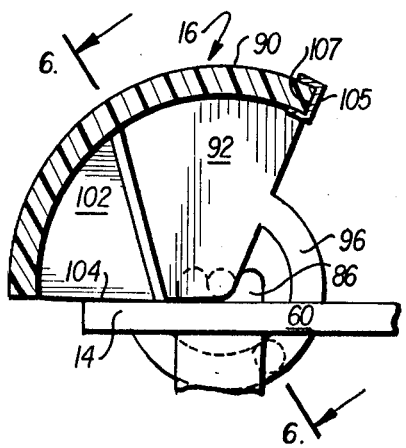
FIG. 5 shows a section view taken along line 5—5 of FIG. 1, indicating the cooperation among the elongated pivot arm and the indicator flag.
Figure 6:
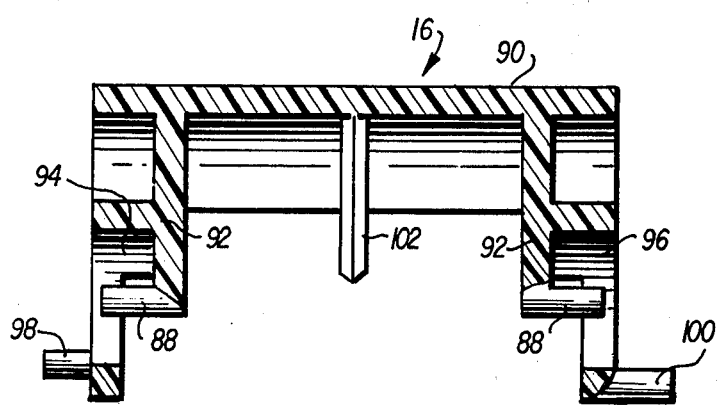
FIG. 6 is a view taken along section line 6—6 in FIG. 5, indicating the geometry of the indicator flag.

Also located on either side of elongated pivot arm 14 and outboard of electrical contacts 70 is a pair of upstanding plain bearing supports 86 into which are snapped the pivot stub axles 88 of indicator flag 16. Indicator flag 16 comprises a tumbler element 90 having a cross section of a sector of a circular cylinder, as indicated in FIGS. 5 and 6. It has been found that approximately a 60° cylindrical sector is suitable for use in this invention. One skilled in the art will recognize that other forms for tumbler 90 may be used, such as two flats subtending arcs of approximately 30° each. Extending radially inwardly from tumbler element 90 are spaced wall sectors 92 of wedge-shaped configuration which include at the center of curvature of tumbler element 90 the pair of integral, axially extending stub axles 88 of signal flag 16. Attached to spaced wall sectors 92 and extending axially therefrom are a pair of crank annuluses 94 and 96 which are coaxial with stub axles 88 and, when signal flag 16 is assembled to plain bearing supports 86, extend into recesses 97 in base element 10, as indicated in FIG. 1. Extending axially from crank annulus 94 is spring mounting finger 98 which extends in a direction approximately parallel to that of pivot stub axles 88 and is displaced at an angle alpha of approximately 35° to 40° from the axis of symmetry of tumbler element 90, as indicated in FIG. 2. A signal flag returning finger 100 extends from crank annulus 96 along an axis essentially parallel to the axis of stub axle 88 and located essentially on the axis of symmetry of tumbler element 90, as indicated in FIGS. 2 and 6.

Centrally located between spaced wall sectors 92 is radially extending wall sector 102 having a lower surface 104 positioned to contact actuating portion 60 of elongated pivot arm 14, as best seen in FIG. 5. An electrical contact strip 105 of U-shaped cross section is attached to leading edge 107 of tumbler element 90, as indicated, and is of sufficient width to bridge contacts 70.

Adjacent the recess 97 which receives crank annulus 94 is located upstanding guide track 106 at either end of which are located plain bearing supports 108 which rotatably receive the sensitivity adjustment mechanism 18. See FIG. 2. Mechanism 18 includes a lead screw 110 upon which is mounted a traveller 112. Lead screw 110 is rotatably snapped into bearing supports 108. Traveller 112 comprises of an essentially rectiangular frame element 114 having a passage 116 therethrough, through which lead screw 110 is inserted. A traveller nut pocket 118 is located coaxially with passage 116 and receives traveller nut 122 which is threadingly mounted on lead screw 110. Depending from the lower surface of rectangular frame 114 are a pair of spaced legs 122 and 124 which are adapted to locate on either side of guide track 106. Thus, as lead screw 110 is turned, traveller nut 120 will cause traveller 112 to move along the lead screw without rotating rectangular frame 114. Laterally extending from the rectangular frame element 114 at an upper location thereof is travelling spring mounting finger 126, the position of which may be adjusted by movement of traveller 112. Finally, an indicator flag biasing spring 128 is stretched between finger 98 on indicator flag 16 and finger 126 on adjustment mechanism 18.

Adjacent the recess 97 which receives crank annulus 96 are upstanding plain bearing supports 130. Plunger rod 132 of flag return mechanism 20 is slidably snapped into supports 130. Plunger rod 132 includes an enlarged diameter portion 134 which prevents plunger rod 132 from sliding out of its proper location in supports 130. Depending from enlarged diameter portion 134 are a pair of spaced prongs 136 and 138 which are adapted to locate on either side of flag returning finger 100. Thus, as indicator flag 16 rotates under the influence of elongated pivot arm 14, flag returning finger 100 will cause plunger rod 132 to slide in bearing supports 130 due to the force applied to prongs 136 and 138 until end 139 of plunger rod 132 extends sufficiently far from the housing 22 to permit a manual reset of the device. Although these features are not shown, housing 22 may include interior depending retaining bosses which lightly contact the upper ends of bearing supports 108 and 130, to prevent accidental ejection of lead screw 110 and plunger rod 132, respectively.

Figure 7A:
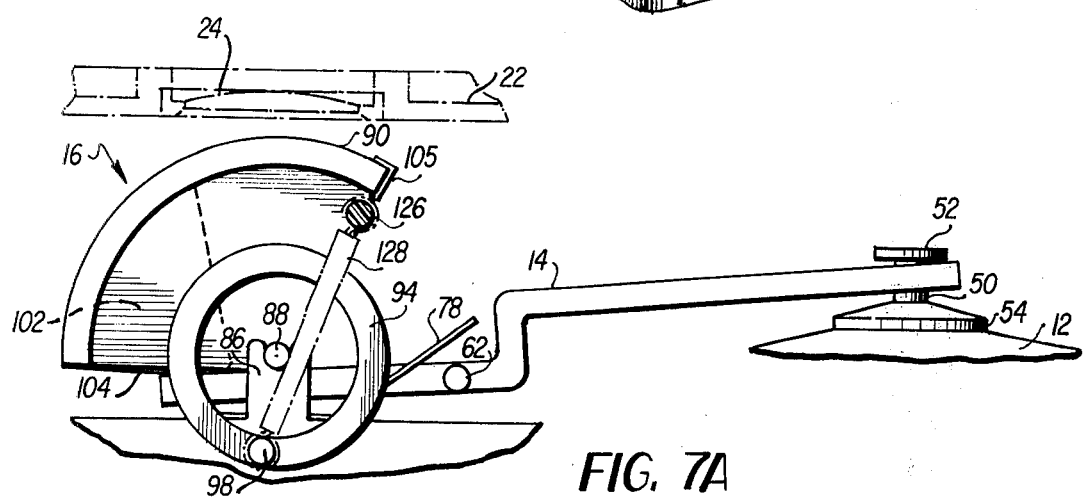
FIGS. 7a and 7b show views taken along line 7—7 of FIG. 1, indicating the movement of the signal flag biasing spring relative to the center of rotation of the signal flag.
Figure 7B:
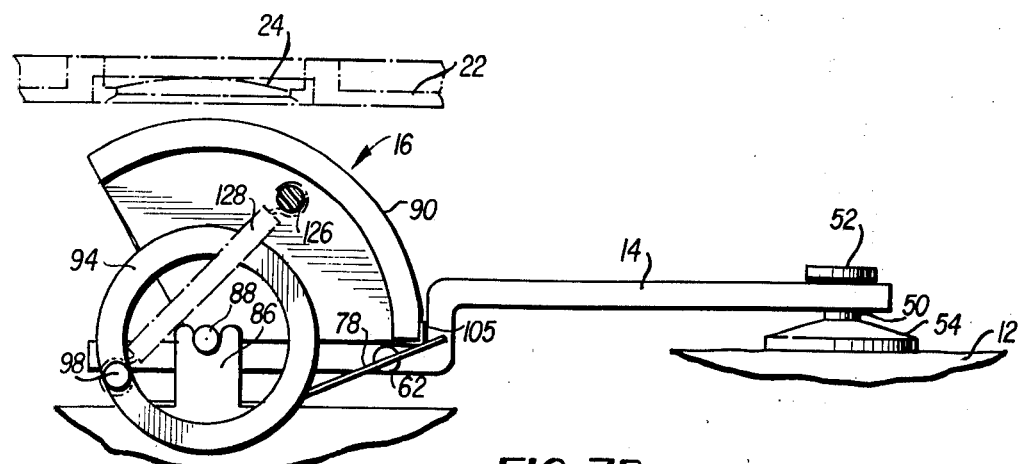

FIGS. 7a and 7b illustrate the movement of indicator flag 16 in response to movement of diaphragm 12. In FIG. 7a, the invention is illustrated in the position which it would normally occupy when the filter being monitored is still relatively clean. In this position, the axis of spring 128 is located on the side of the axis of rotation of indicator flag 16 closest to transverse pivot axis 62 of elongated pivot arm 14. Thus, the force applied by spring 128 will tend to rotate indicator flag 16 in a counter-clockwise direction, thereby maintaining contact between lower surface 104 of centrally located wall sector 102 and causing elongated pivot arm 14 to raise diaphragm 12 to the elevated position shown in FIGS. 1 and 7a. As the pressure beneath diaphragm 12 drops or the pressure above diaphragm 12 rises, the diaphragm will begin to be pulled or pushed downward as viewed in FIG. 7a which results in a gradual rotation of indicator flag 16 in a clockwise direction. Until the time that the axis of spring 128 crosses the axis of rotation of indicator flag 16 defined by pivot stub axles 88, the force applied by spring 128 will resist the force applied by elongated pivot arm 14. As soon as the force transmitted to pivot arm 14 due to the pressure acting on diaphragm 12 is sufficient to move the axis of spring 128 past the center of rotation of indicator flag 16, the force applied by spring 128 will aid the further rotation of indicator flag 16 in the clockwise direction. In fact, the force applied by spring 128 then serves to overcome the inertia and friction of the mechanism and to move the indicator flag 16 rapidly from the position shown in FIG. 7a to the position shown in FIG. 7b, where the change in position of the axis of spring 128 relative to the center of rotation of indicator flag 16 may be most clearly seen. In the position shown in FIG. 7b, electrical contact is established between spring portions 78 and contact strip 105, as indicated. Spring portions 78 and spring 128 act oppositely to ensure good electrical contact. FIGS. 7a and 7b also indicate, in phantom, the approximate location of housing 22 and window 24 relative to indicator flag 16.

Figure 8A:
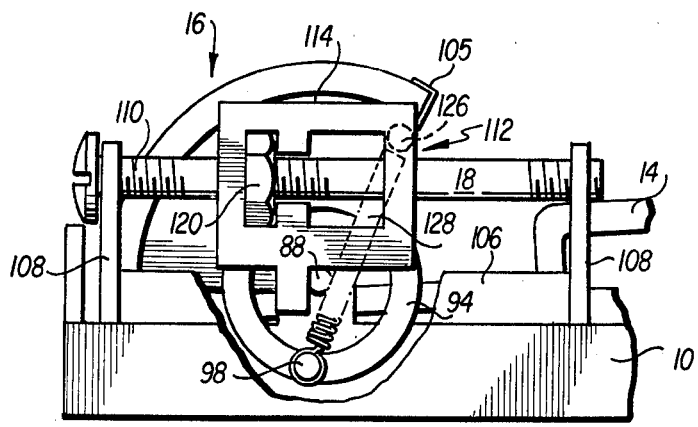
FIGS. 8a and 8b show views, partially cut-away, taken along line 8—8 of FIG. 1, indicating the movement of the sensitivity adjustment mechanism whereby the biasing force of the spring may be varied.
Figure 8B:
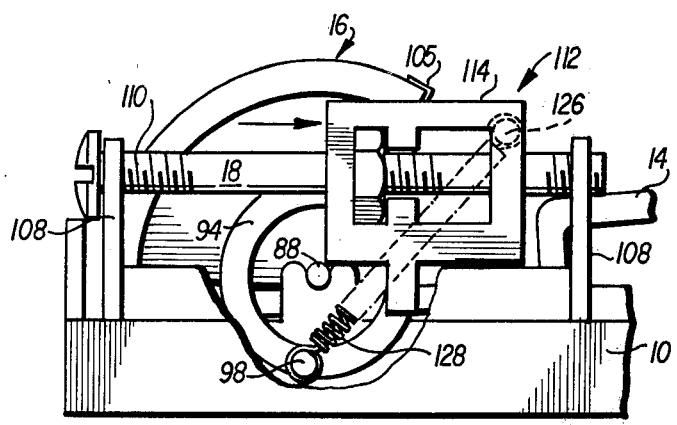

FIGS. 8a and 8b illustrate the operation of sensitivity adjustment mechanism 18. In FIG. 8a, traveller 112 has been adjusted on lead screw 110 so that the axis of spring 128 is located relatively close to the center of rotation of indicator flag 16 as defined by pivot stub axle 88. In this position, a relatively small downward movement of diaphragm 12 in response to pressure changes will be sufficient to move the axis of spring 128 over the center of rotation of indicator flag 16 and thereby to cause the indicator flag 16 to move to the dirty filter position shown in FIG. 7b. If it is desired to adjust the device so that it will not actuate until a substantially larger displacement of elongated pivot arm 14 is caused by movement of diaphragm 12, lead screw 110 may be turned to cause traveller 112 to move the position of finger 126 from that shown in FIG. 8a.

Obviously, the force on diaphragm 12 must be larger to effect the larger displacement. It may be seen that in this position, spring 128 has been extended considerably whereby additional biasing force is applied to indicator flag 16. Thus, a greater force must be applied by diaphragm 12 to elongated pivot arm 14 in order to move the axis of spring 128 past the center of rotation of indicator flag 116 in opposition to the increased biasing force of spring 128.

Figure 10:
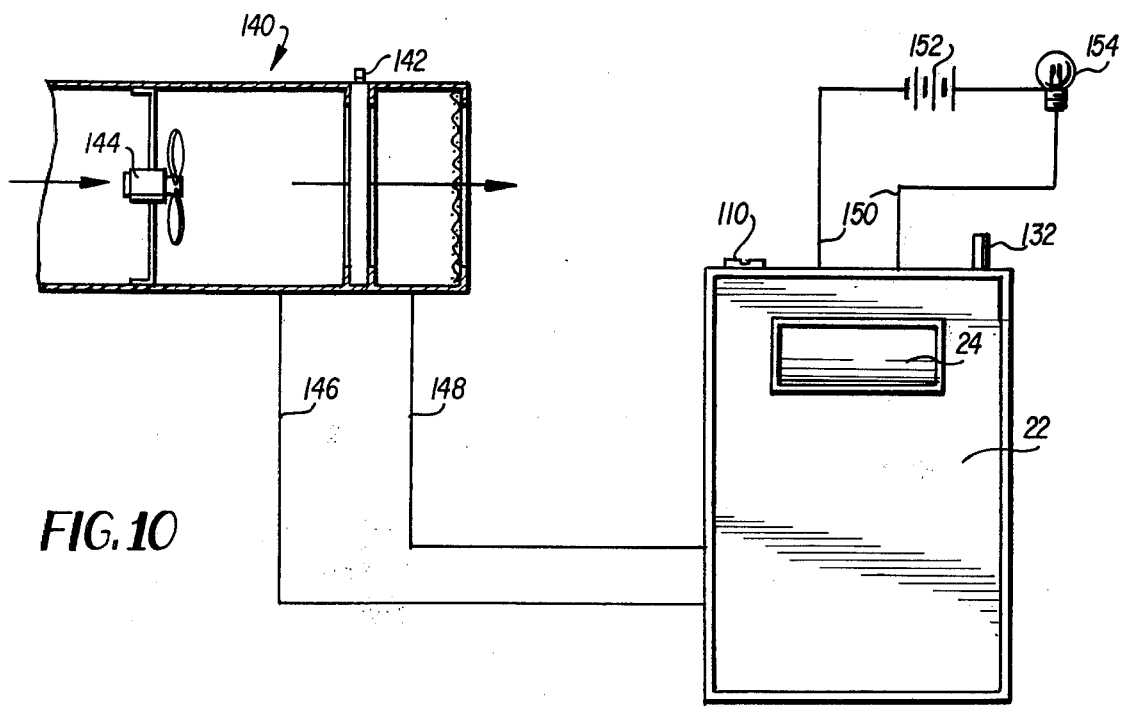
FIGS. 9 and 10 are schematic illustrations of alternate application of the monitoring device according to the invention, in systems wherin the means for forcing air through the filter is located either up or downstream of the filter itself.
Figure 9:
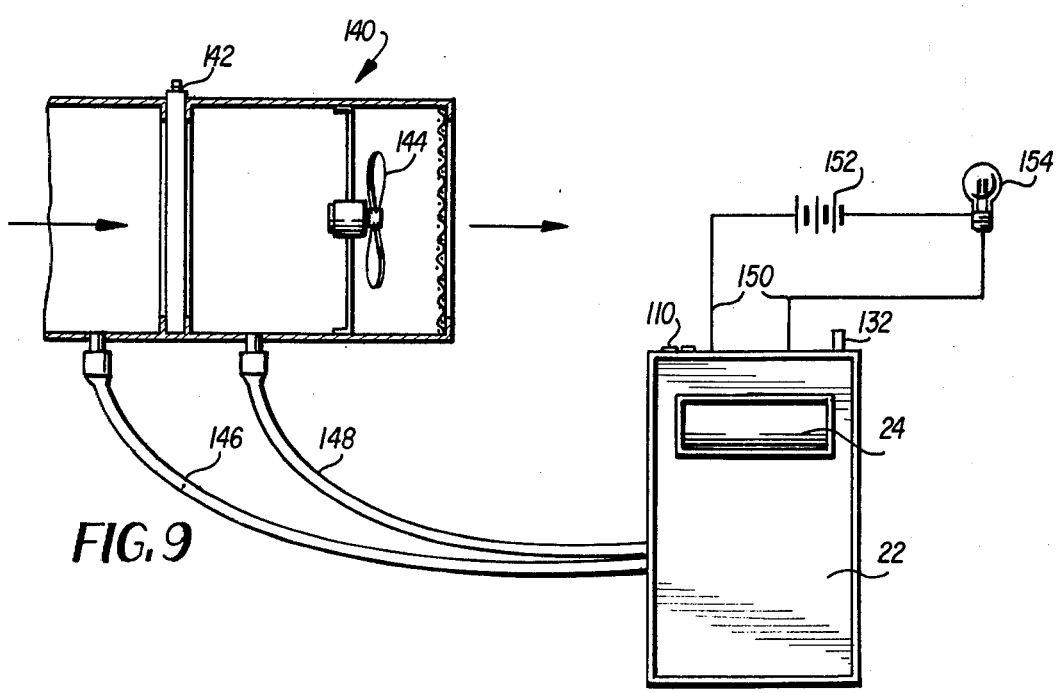

FIGS. 9 and 10 shown schematic illustrations of forced air systems adapted for monitoring by the present invention. The forced air system 140 includes a filter element 142 through which heated or cooled air is drawn (FIG. 9) or forced (FIG. 10) by a fan 144 located downstream (FIG. 9) or upstream (FIG. 10) of element 142. An upstream line 146 may be directed from the upstream side of filter element 143 to high pressure inlet 13, or a downstream pressure line 148 may be directed from the downstream side of filter element 142 to low pressure inlet 11 below diaphragm 12. If desired, both inlets 11 and 13 may be used, to actuate the device on differential pressure. Conductors 150 are connected to electrical contacts 70, power source 152, such as a battery or the like, and alarm device 154, such as a light bulb, bell, horn or combination of alarms. If desired, the mechanism enlcosed within housing 22 may be located directly on the ducting of the forced air system 140 and the alarm element 154 may be placed at a remote location such as in the living spaces of a private home.

In operation, the device is connected to a forced air system as indicated in FIGS. 9 and 10 and is set to indicate a clean filter by depressing plunger 132. During the course of operation of system 140, filter element 142 will gradually become filled with dust and other contaminates which will result in the development of a partial vacuum on the downstream side of filter 142 in the system shown in FIG. 9 or in the development of a super atmospheric pressure on the upstream side of filter 142 in the system shown in FIG. 10. In either of these events, the change in pressure acting on filter element 142 will cause diaphragm 12 to move downwardly. This causes elongated pivot arm 14 to apply a rotating force to indicator flag 116, as discussed with regard to FIGS. 7a and 7b. When the applied force is large enough, indicator flag 16 will rotate the position in FIG 7b. As soon as indicator flag 16 has been rotated to the position shown in FIG. 7b, an electrical circuit is completed in the system shown in FIGS. 9 and 10 and the alarm element 154 is actuated. After the clogged filter has been changed or cleaned, plunger 132 is depressed again to return the device to the configuration shown in FIG. 7a. System operation then is continued.

Except as previously noted, the components of the invention may be manufactured from well-known thermal plastics such as polycarbonates, acetyl resins and the like; however, other suitable materials may occur to those skilled in the art. To minimize rotating and sliding friction between the various elements of the invention, applicant prefers to use plastics which have been impregnated with molybdenum disulfide or Teflon. Specifically, the elongated pivot arm, signal flag anad reset arm should preferably be made of such materials or other materials having a high degree of inherent lubricity, which will minimize friction in use. The spring contact and contact strip may be manufactured from 0.005 inch beryllium copper or other suitable materials.

The diaphragm actuator according to the invention provides a substiantial actuating force applied to the elongated pivot arm. Using a diaphragm of 0.00025 inch, 25 Gauge Type S Mylar film having a diameter of 2.273 inches, the partial vacuum under the diaphragm was varied from 0.1 to 1.0 inches of water and the force applied to the pivot arm measured as follows:

| Inches of Water | Pivot Arm Force-grams |
| --- | --- |
| 0.1 | 5 |
| 0.2 | 8 |
| 0.3 | 11 |
| 0.4 | 13 |
| 0.5 | 15 |
| 0.6 | 17 |
| 0.7 | 18 |
| 0.8 | 19 |
| 0.9 | 20 |
| 1.0 | 21 |

The device exhibits excellent repeatability of results, with less than 1 gram variation in applied force even with sudden changes in system flow rates.

Having described my invention in sufficient detail to enable one skilled in the art to make and use it, I claim:

1. Apparatus for indicating the condition of a filter in a forced air system comprising:
   a base member;
   an enclosed chamber mounted on said base member, one wall of said chamber comprising a flexible diaphragm having an interior surface within said chamber and an exterior surface;
   means operatively associated with said base member for directing fluid pressure from either the upstream or the downstream side of said filter to either the interior or the exterior side of said diaphragm;
   an elongated arm mounted to pivot relative to said base member;
   means for pivotally connecting said arm to said flexible diaphragms;
   indicator flag means mounted for rotation relative to said base member, said elongated arm contacting said flag means to cause rotation thereof in response to movement of said diaphragm due to changes in the pressure in said system; and
   means connected to said indicator flag means for resisting movement of said flag means from a first position indicative of a clean filter until said arm has rotated said flag means a predetermined amount in response to said changes in pressure, and for aiding movement of said flag means to a second position indicative of a dirty filter after said flag means has moved said predetermined amount.

2. Apparatus as claimed in claim 1, further comprising means operatively connected to said means for resisting and aiding movement for adjusting said predetermined amount.

3. Apparatus as claimed in claim 1, further comprising means operatively connected to said flag member and said base element for returning said flag member to said first position.

4. Apparatus as claimed in claim 1, further comrpising, a pair of electrical contacts mounted on said base member;

an electrical contactor strip mounted on said flag means in position to bridge said contacts when said flag means is in said second position;

an electrical circuit connected across said contacts, said circuit including a source of electrical power and signalling means to be acutated when said flag means is in said second position.

5. Apparatus as claimed in claim 2, wherein said means for resisting and aiding movement of said flag means comprises an elongated spring connected at its one end to said flag means at a radial distance from the axis of rotation of said flag means and connected at its other end to said base member at a location chosen to cause said elongated spring to stretch and to pass over said axis of rotation as said flag means moves said predetermined amount and to contract as said flag means moves to said second position; and said adjusting means is adapted to move said chosen location to vary the force applied by said spring when said flag means has rotated said predetermined amount.

6. Apparatus as claimed in claim 5, wherein said adjusting means comprises a lead screw rotatably mounted on said base member and a traveler element mounted for axial movement on said lead screw in response to rotation thereof, the other end of said elongated spring being attached to said traveler element.

7. Apparatus as claimed in claim 3, wherein said returning means comprises a finger element extending from said flag member in a direction essentially parallel to the axis of rotation of said flag member, plunger means slidably supported on said base member for movement in a direction essentially transverse to said axis of rotation and a pair of spaced prongs extending from said plunger means and slidably receiving said finger element therebetween.

8. Apparatus as comprises in claim 4, wherein each of said electrical contacts comrises an essentially flat base portion for attachement to said base member and an angularly upstanding spring portion for engagement with said contactor strip.

9. Apparatus as claimed in claim 1, wherein said chamber is recessed in said base member and has an upstanding peripheral wall extending above an upper surface of said base member, said flexible diaphragm being sealing joined to an upper edge of said upstanding peripheral wall.

10. Apparatus as claimed in claim 1, wherein said flexible diaphragm includes an upstanding pivot post located essentially centrally thereof, said pivot post having a radially extending terminal flange thereon; and said elongated arm includes an axial slot slidably engaging said pivot post between said flexible diaphragm and said terminal flange.

11. Apparatus as claimed in claim 10, wherein said flexible diaphragm comprises a centrally located aperture; said pivot post comprises a radially extending base flange and an axially extending mounting boss, said mounting boss extending through said aperture into said chamber; further comprising washer means and retaining flange means for holding said flexible diaphragm to said base flange.

12. Apparatus as claimed in claim 1, wherein said indicator flag comprises a tumbler element of cylindrical shell crossection having inner and outer curved surfaces; a pair of spaced walls extending radially inwardly from said inner curved surface; and at least one pivot axle mounted on said spaced walls and extending essentially axially of said cylinder for mounting said tumbler element for rotation relative to said base.

13. Apparatus as claimed in claim 12, further comprising crank annulus means extending from at least one of said pair of spaced walls essentially coaxially with said pivot axle, said means for resisting and aiding movement of said indicator flag being connected to said crank annulus.

\* \* \* \* \*